(12) United States Patent
Wilder et al.

(10) Patent No.: US 9,507,335 B2
(45) Date of Patent: Nov. 29, 2016

(54) REMOTE BARRIER OPERATOR COMMAND AND STATUS DEVICE AND OPERATION

(75) Inventors: Steven E. Wilder, Ashland, OH (US); Mark Kenneth Siegesmund, Brookfield, WI (US); Leroy G. Krupke, Carrollton, TX (US)

(73) Assignee: Overhead Door Corporation, Lewisville, TX (US)

( * ) Notice: Subject to any disclaimer, the term of this patent is extended or adjusted under 35 U.S.C. 154(b) by 505 days.

(21) Appl. No.: 13/485,687

(22) Filed: May 31, 2012

(65) Prior Publication Data

US 2013/0321127 A1    Dec. 5, 2013

(51) Int. Cl.
*G05B 19/00* (2006.01)
*G05B 19/042* (2006.01)
*E05F 15/77* (2015.01)
*E05F 15/684* (2015.01)

(52) U.S. Cl.
CPC ............. *G05B 19/042* (2013.01); *E05F 15/77* (2015.01); *E05F 15/684* (2015.01); *E05Y 2400/812* (2013.01); *E05Y 2400/822* (2013.01); *E05Y 2800/106* (2013.01); *E05Y 2900/106* (2013.01); *G05B 2219/2628* (2013.01)

(58) Field of Classification Search
None
See application file for complete search history.

(56) References Cited

U.S. PATENT DOCUMENTS

| | | | |
|---|---|---|---|
| 6,388,559 B1 | 5/2002 | Cohen | |
| 6,980,117 B1 | 12/2005 | Kirkland et al. | |
| 6,998,997 B2 | 2/2006 | Stevenson et al. | |
| 7,071,813 B2 | 7/2006 | Fitzgibbon | |
| 7,196,623 B1 | 3/2007 | Wang | |
| 7,224,275 B2 | 5/2007 | Fitzgibbon | |
| 7,498,936 B2 | 3/2009 | Maeng | |
| 7,504,931 B2 * | 3/2009 | Nguyen | 340/426.36 |
| 7,876,218 B2 | 1/2011 | Fitzgibbon | |
| 2006/0158344 A1 * | 7/2006 | Bambini | G05B 19/0426 340/12.22 |
| 2007/0229218 A1 * | 10/2007 | Nassimi | 340/5.61 |
| 2009/0160637 A1 | 6/2009 | Maeng | |
| 2011/0063094 A1 * | 3/2011 | Meiertoberens | A61B 5/0002 340/12.5 |

* cited by examiner

*Primary Examiner* — Benjamin C Lee
*Assistant Examiner* — Rajsheed Black-Childress
(74) *Attorney, Agent, or Firm* — Gardere Wynne Sewell LLP

(57) ABSTRACT

The present disclosure provides a barrier operator system in which a remotely located transceiver type controller is in wireless communication with a transceiver type adapter connected to a barrier operator, and in electronic communication with the barrier operator's microcontroller. The controller is operable to wirelessly transmit door operator status inquiries to the adapter. This may be effected automatically in connection with the transmission and receipt by the adapter of door toggle commands or separate and apart from same. The status information is wirelessly transmitted by the adapter in broadcast form without source or destination address to the remote device in a signal that is non-addressed broadcast door operator (and, indirectly, door) status information by relying upon the receipt of the message by the remote within the specific time limit of the reception window of the remote.

10 Claims, 7 Drawing Sheets

REMOTE BARRIER OPERATOR COMMAND AND STATUS DEVICE AND OPERATION

BACKGROUND

1. Technical Field

The present invention relates generally to barrier operator systems, more particularly to the remote receipt of barrier operator status information, and even more particularly to a system and process for remotely transmitting commands to a barrier operator and for remotely receiving the status of the operator as a consequence of such commands.

2. Introduction

Barrier operator systems generally operate to move the particular barrier, for example a garage door, between open and closed positions in response to a command signal sent from a command controller device to the garage door operator. These command controller devices may be wall consoles located inside or outside the garage or remotely located transmitters wirelessly transmitting the commands to the garage door operator. In instances in which the command is sent from a remotely located wireless transmitter located in a driver's vehicle, the driver may be out of view of the garage door before the time that the garage door operator would have completed its opening or closing operation. This typically results in considerable inconvenience in that the departing driver is required to return to view the garage door's status, or the arriving driver, when reaching the garage, finds the door which has been commanded to open, is still closed. Various devices have evolved in an attempt to remedy this problem, but none have been found completely suitable for all conditions of service.

SUMMARY

The following disclosure is directed to a barrier operator system in which a remotely located transceiver type controller, preferably located in a vehicle, is in wireless communication with a transceiver type adapter removably connected to a garage door operator, and in electronic communication with the door operator's microcontroller. The remote controller is operable to wirelessly transmit door operator (and, therefore, indirectly door) status inquiries to the door operator's microcontroller, by way of the adapter, and wirelessly receive such status (e.g., door opening, door open, door closing, door closed) from the adapter, and information as to whether the door is open or closed is then conveyed to the driver. As a particular feature, this status inquiry and receipt is automatically initiated in connection with the adapter's acknowledgement of receipt of a prior open or close door command from the remotely located controller. In accordance with another feature, the door operator status is transmitted as a non-addressed broadcast signal and received by the remote controller within a time limited reception window.

These and other features, as well as the advantages thereof, will become readily apparent from the following detailed description, read in conjunction with the accompanying drawings, in which:

DETAILED DESCRIPTION

Figure 1A:
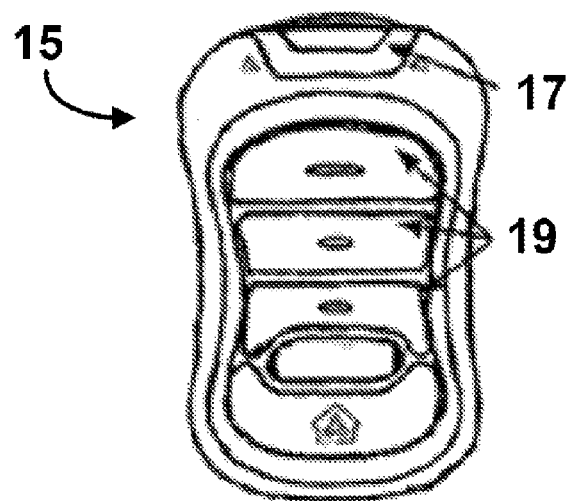
FIG. 1A is an illustration of an embodiment of a remote controller component suitable for use in the system of the present invention.

In the description that follows, like parts are marked throughout the specification and drawings with the same reference numerals, respectively. The drawings are not necessarily to scale and certain features may be shown exaggerated in scale or in somewhat schematic form in the interest of clarity and conciseness.

Figure 1:
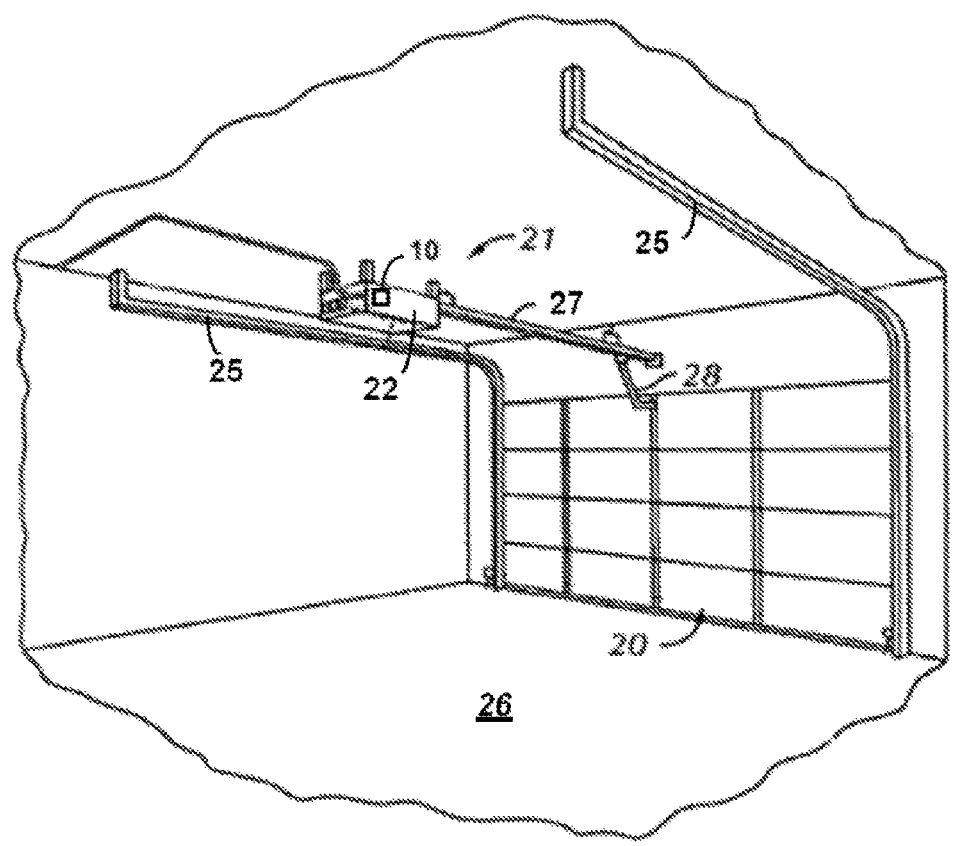
FIG. 1 illustrates a typical residential garage door opening system with an adapter component coupled to the garage door operator powerhead.

Referring initially to FIG. 1, a representative embodiment of a barrier operator system is illustrated, here including a garage door operator 21 for controlling the opening and closing of a residential garage door 20. The door 20 is movable along opposed sets of guide tracks 25 between a lowermost (or closed) position, as shown, covering the vehicle entrance to, or exit from, the garage, and an uppermost (or open) position, in which the door 20 has traveled the substantial length of the tracks to a position parallel to the floor 26, thereby providing a passageway for the vehicle to enter or exit the garage. The door operator 21 is disposed within a housing or powerhead 22, and conventionally includes a microcontroller 38 (FIG. 3) for, among other functions, processing incoming wired and wireless transmitted door movement commands and generating consequent control signals to an operationally coupled motor drive for an AC or DC motor (not shown). As is conventionally known, the motor is effective to reciprocatably impel, along rail 27, a suitable drive mechanism, such as an interconnected endless belt or chain and carriage assembly, for operable coupling with an arm 28 connected to the door 20, thus enabling the respective opening and closing of the garage door 20 in compliance with the aforementioned door commands. Various types of operators of different configurations and operations, well known to those of ordinary skill in the art, may be used for door operator 21. One suitable configuration and operation is the door operator described in Reed et. al., U.S. Pat. No. 6,118,243, issued Sep. 12, 2000, assigned to the assignee of the present invention, and incorporated herein by reference for all purposes. Moreover, the overall barrier operator system may include additional features, including those described in co-pending, PCT patent application, No. PCT/US 2012/038995, filed May 22, 2012, assigned to the assignee of the present invention, and incorporated herein by reference for all purposes.

An adapter device 10 (FIGS. 1, 2A, 2B and 3), of transceiver configuration, is removably connected with the garage door operator 21 powerhead 22 such that it is in electronic communication with microcontroller 38, as well as in wireless communication with a remotely located controller device 15 (FIGS. 1A and 3), also of transceiver configuration, appropriately positioned in the vehicle. In accordance with a feature of the present invention, and as subsequently described in greater detail, the controller 15 is adapted to wirelessly transmit door command signals, preferably encrypted, to the adapter 10, where they are thereafter routed to the microcontroller 38 for execution of such door commands. The remote controller 15 is also adapted to wirelessly make inquiry of the status of the door operator 21 microcontroller, the adapter 10 providing such status information (e.g., door opening, door open complete, door closing, or door close complete) to the remote controller 15, the controller 15 adapted to thereafter audibly and/or visibly advise the driver of whether the door is open or closed. The response to the inquiry is preferably by way of a signal in broadcast format without source or destination addressing being a portion of such. In a preferred embodiment, the status inquiry is automatically initiated from the controller 15 in response to confirmation from the adapter 10 of its receipt of the door commands from the remote controller 15. In an alternate embodiment, the status inquiry is initiated from the remote controller 15 by the user manually actuating the controller 15 to transmit such status inquiry to the adapter 10. In any event, the communication link between the controller device 15 and the adapter 10 should desirably have a compatible communication protocol and, where encryption/decryption of the door commands are involved, identical cryptographic coding, for example Intellicode® or Intellicode® 2.

While the controller 15 has been, and will be further, described with respect to the transmission of door operator (toggle) commands, and the resulting door operator status (and, indirectly, door status) as a result of such commands, it is to be understood that the present system and process are not so limited and that any type of transmitted command, including but not limited to turning the garage worklight on or off, or enacting or disabling the vacation mode of the operator, is within the purview of this disclosure. Moreover, the disclosed system and process are not limited to residential garage door opener systems but may be incorporated in other barrier operating systems such as those involving rolling doors, gates or commercial doors, as just examples.

Figure 2A:
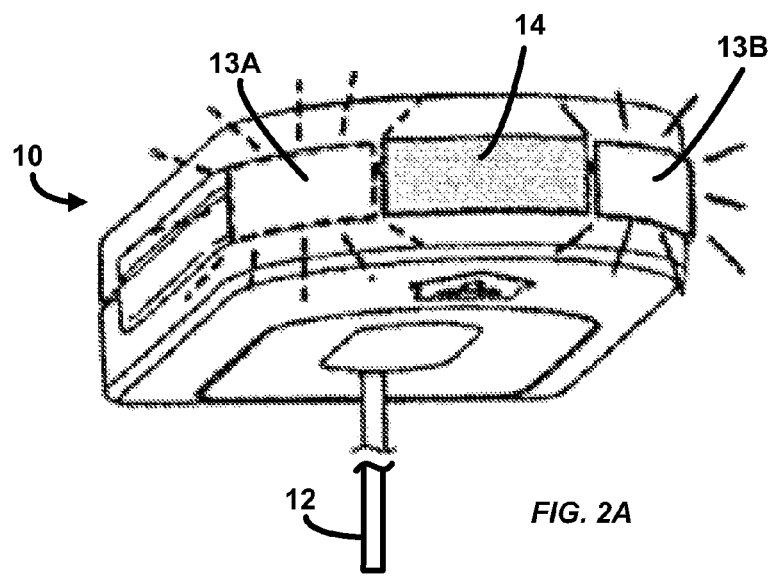
FIGS. 2A and 2B illustrate perspective views of a preferred embodiment of the adapter component of FIG. 1.
Figure 2B:
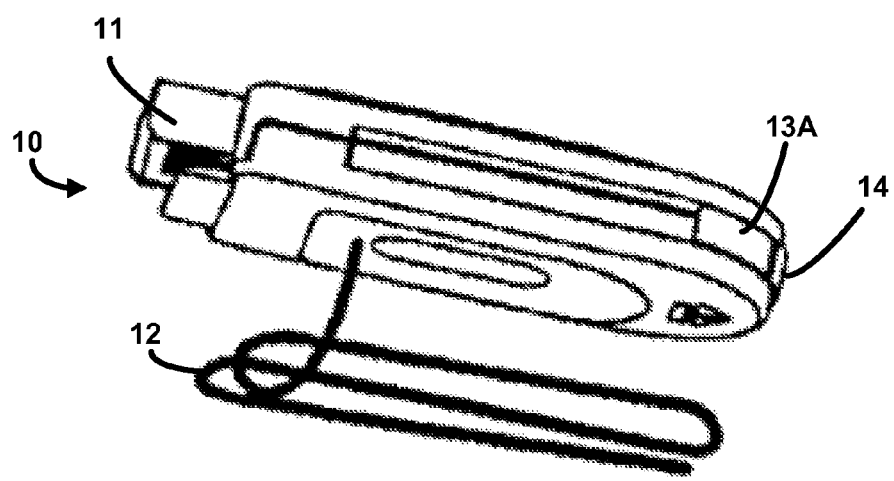
Figure 3:
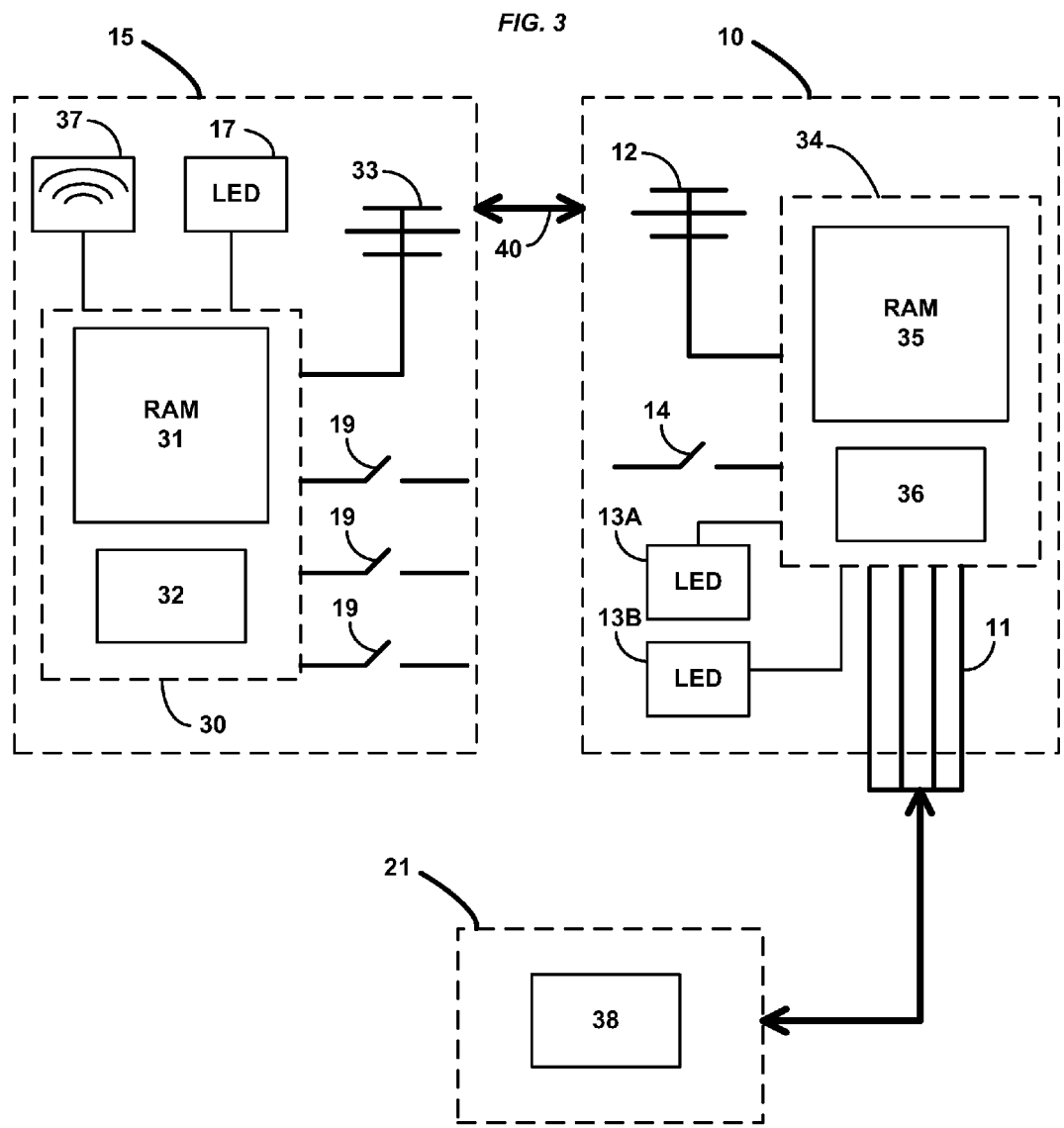
FIG. 3 illustrates a block diagram of the interrelationship of the remote controller, adapter, and garage door operator and microprocessor in accordance with a preferred embodiment of the system of the present invention.

While various types of transceivers, suitable in design and operation, may provide the adapter device 10, one preferred embodiment illustrated in FIGS. 2A and 2B, and schematically shown in block diagram form in FIG. 3, represents the Network Adapter currently produced and marketed by The Genie Company of Mt. Hope, Ohio, additional details of which are incorporated herein by reference. The adapter 10 is removably connected to the garage door operator 21 by insertion of the adapter's extension member 11 with its conductive connection pins into a communications port (not shown) on a side of the garage door operator powerhead 22. The communication port, for example a serial port, parallel port or USB port, provides the interconnection between the adapter 10 and a universal asynchronous receiver/transmitter (UART) interface with the microcontroller 38 of the door operator 21. An antenna 12 (FIGS. 2 and 3) extending from the adaptor 10 is effective to receive wireless communications from the remote controller 15, which communications are then conveyed to the microcontroller 38 (FIG. 3) via the UART interface. Likewise, status and other messages from the microcontroller 38 pass via the UART interface to the antenna 12 where, under program control of the microprocessor 34, they are transmitted via wireless path 40 to an antenna 33 of the controller 15 (see FIG. 3).

As shown in FIG. 3, microcontroller 34 of adapter 10 includes RAM 35 and has non-volatile memory chips 36 programmed to, inter alia, enable the adapter to communicate with both the remote controller 15 and the microcontroller 38 of the garage door operator 21. The microcontroller 34 may, for example, be a Texas Instruments CC 1110 microprocessor with integrated 915 MHz frequency capability. The adaptor 10 furthermore includes LEDs 13A and 13B, the different sequence of flashing and solid lights of these LEDs, as well as differentiation of color between LED 13A and LED 13B, serving to indicate the various operating conditions of the adapter. Button 14 is provided (FIGS. 2A, 2B and 3) which, when briefly pressed, activates or deactivates the learn mode of the adapter, for the purposes subsequently described in greater detail. In some embodiments, the button 14 may be pressed and held for a predetermined period of time to erase all learned data.

Remote controller 15 is also transceiver, a preferred embodiment of such disclosed in FIG. 1A, the controller 15 preferably incorporating a clip (not shown) for mounting the device to a vehicle visor. One or more push-button type switch actuators 19 initiate the various operations that can be performed by the controller, with a multi-color (e.g., red, green and orange) LED 17 providing a means for visually indicating to the driver the open or closed status of the garage door. A sound transducer 37 (FIG. 3) is also provided for audibly indicating such door status.

The remote controller 15 also has an antenna 33 for respectively transmitting and receiving the data to and from the antenna 12 of the adapter along the wireless path 40 (FIG. 3), as subsequently described in greater detail. The controller 15 further includes, as a preferred embodiment, a microcontroller 30 with RAM 31 and non-volatile memory chips 32 programmed to, inter alia, enable the controller 15, when one of the switches 19 is actuated, to transmit, via antenna 33, randomly-generated, code-encrypted RF door toggle command signals (e.g., open, close) over the 915 MHz wireless communication path 40. In accordance with one preferred embodiment, the microcontroller 30 is further programmed to enable the controller 15 to automatically transmit one or more door operator status inquiry messages in response to receiving confirmation from the adapter 10 of its receipt of the door toggle commands transmitted by the controller 15. In an alternate embodiment, the microcontroller 30 is programmed to enable the controller 15 to transmit these door operator status inquiry messages in response to manual actuation of a switch 19 by the user.

Microcontroller 30 may, for example, be a Texas Instruments CC1110 microprocessor with integrated 915 MHz frequency capability. In some embodiments, the coded command transmission may utilize the AES encryption algorithm and frequency-hopping spread spectrum. This microprocessor contains the firmware for handling the 915 MHz radio communication network 40, and is capable of a frequency range of 782-928 MHz.

In accordance with the overall operation of the aforedescribed network of the present invention, communication is established between the adapter 10 and the microcontroller 38 of garage door operator 21 by way of the conductive connection pins of extension 11 of the adapter 10 inserted in the communications port of the powerhead 22. The microcontroller 38 of the garage door operator 21 is thus able to transmit "establish—communication" packets to the adapter 10. Each such packet contains a random number used to help authenticate the adapter 10, and is typically outputted by the microcontroller 38 of the garage door operator 21 upon power up and/or whenever data is observed over the communications port and communications have not yet been established. Upon receiving the establish—communications packet, the adapter 10 transmits an authentication response to the microcontroller 38. The authentication response contains the random number included in the packet establishing communication, but now encrypted, as well as a new random number generated by the adapter 10. If the encrypted random number matches the random number transmitted by the microcontroller of the operator 21 in the establish—communications packet, the operator 21 then transmits an authentication accepted packet containing the adapter's random number, but now encrypted, thereby acknowledging that the adapter 10 is authorized to communicate with the microprocessor 38 of the garage door operator 21. Once the adapter 10 verifies the encrypted random number matches the random number it sent in the authentication response, a link is established between the adapter 10 and the microcontroller 38 of the garage door operator 21, and all other commands or communication from the adapter 10 may then be received by the microcontroller 38 of the garage door operator 21.

The serial number or ID of a particular device (e.g., remote controller or adapter) is used as the device's address for data communication. Therefore, in some embodiments, the adapter 10 receives all incoming transmissions from devices that know, and properly indicate, the device address (ID) and encryption key of the adapter 10, wherein this information is typically obtained through a pairing process described hereinafter. Accordingly, a transmission from the remote controller 15 to a particular adapter (e.g., adapter 10) may be carried out by incorporating the ID of the particular adapter in a communication data packet bearing the encrypted door toggle command (or any other data) initiated by actuation of a particular switch actuator 19 of the remote controller 15. The ID of the adapter 10 serves as the address for data transmitted from the remote controller 15 to the adapter 10. For example, in one embodiment, individual door toggle commands transmitted in response to actuation of a switch actuator 19 are addressed to the ID of the particular adapter trained to the pressed switch actuator 19. In another embodiment, door operator status requests transmitted in response to actuation of a switch actuator 19 are addressed to the ID of the particular adapter trained to the pressed switch actuator 19.

In some embodiments, the adapter 10 may ignore received commands or communication unless an authorization process is performed. An example of the authorization process is discussed herein with respect to the flowchart provided in FIG. 4, wherein, in step 401, the user actuates a switch actuator 19 trained to a particular adapter 10. The controller 15 attempts to initiate communication with that adapter 10 by iteratively transmitting a synchronization signal and authorization request message on each channel in step 402. The targeted adapter 10 detects the synchronization signal on one of the channels in step 403, and enters into a channel lock mode in step 404. When in the channel lock mode, the adapter 10 dwells on a channel for a predetermined period of time that is at least long enough to receive the synchronization signal and authorization request message from the remote controller 15. The adapter 10 continues to stay locked onto the channel in which messages continue to be exchanged successfully, until a maximum amount of time for channel lock is exceeded. The channel lock mode is further discussed below.

Upon successfully receiving the authorization request from the remote controller 15 in step 405, the adapter 10 responds with a challenge message data packet containing a random number encrypted with a master key, and specifically addressed to the controller 15 in step 406. Upon receiving the challenge message data packet in step 407, the controller 15 enters a channel lock mode in step 408, decrypts the challenge message data packet in step 409, and retransmits the random number obtained from that packet to the adapter 10 in step 410. Upon verifying, in step 411, that the random number received from the remote controller 15 is a match to the one that the adapter 10 transmitted, the adapter 10 responds with a non-encrypted acknowledgement signal, in step 412, that indicates that the remote controller 15 is now authorized to send commands to the adapter 10.

In order to establish communication between the remote controller 15 and the adapter 10, the controller 15 is paired with the adapter 10 by training at least one of its switch actuators 19 to the adapter 10. A switch actuator 19 of the remote controller 15 may be trained to a particular adapter 10 by a binding process wherein the controller 15 and adapter 10 enter a learn mode. The adapter 10 may enter the learn mode by activation of the learn mode button 14 located on the adapter 10. The binding process may be started upon the activation of an unbound switch actuator 19 (that is, a switch actuator 19 not trained to a particular adapter). Upon activation of the unbound switch actuator 19, the remote controller 15 transmits a ping message to a generic address, which is received by the adapter 10 when the adapter 10 is in the learn mode. The adapter 10 then transmits a non-encrypted bind notification signal (containing the address, or ID, of the adapter 10) to notify the remote controller 15 that the adapter 10 is in the learn mode. Upon receiving the bind notification signal, the controller 15 enters the learn mode. The user again presses the unbound switch actuator 19, and the controller 15 transmits a bind request packet to request binding of the unbound switch actuator 19 to the adapter 10. The bind request packet includes data identifying the type of device making the request (e.g., remote controller), an identifier for the specific button that was pressed (e.g., the unbound switch actuator 19), and the address of the device making the request. The address of the device making the request is sent so that the receiving device (i.e., adapter 10) can verify the bind request packet was decrypted successfully by comparing the address of the device making the request to the packet source address.

Upon receiving and validating the bind request packet, the adapter 10 transmits a bind acceptance packet encrypted with the adapter's manufacturing key, and exits the learn mode. The manufacturing key is a common key shared by the devices in the network (e.g., the adapter 10 and remote controller 15). The bind acceptance packet includes a device specific key of the adapter 10 (preferably encrypted), the device type of the adapter 10 that is accepting the bind request, and the identifier of the button that is being learned. The device specific key is a unique key generated randomly for a particular device. The remote controller 15 then receives and decrypts the bind acceptance packet, and stores the data comprising the bind acceptance packet in a bind table, and exits the learn mode. The data stored in the bind table is subsequently used to address transmissions generated by activation of the now bound switch actuator 19 to the adapter 10.

In some embodiments, a single remote controller 15 may be programmed to communicate with multiple adapters 10 each associated with a microcontroller 38 of a separate garage door operator 21. In such embodiments, each of the adapters 10 are trained to receive transmissions from the remote controller 15 in response to actuation of a particular switch actuator 19. Moreover, and as subsequently described in greater detail, while a controller 15 can be wirelessly trained to one or more adapters 10 during, and for the purpose of, the door toggle command operation, the controller 15 and adapter(s) 10 are not so trained for the purpose of door operator status (also referred to as door status) transmission and reception, as the door operator status is broadcast for all remote controllers to receive, and not solely addressed to a targeted or particular remote controller.

The remote controller 15 provides visual and audible notification to a user by way of a multi-color LED 17 and a sound transducer 37. The notification may indicate, for example, successful receipt of a door toggle command, the status of the garage door 20, successful actuation of a switch 19, or various other events. For example, successful receipt of a door toggle command may be indicated by the LED 17 quickly flashing green twice and the transducer 37 sounding a short tone. In this example, if the door toggle command includes an instruction to close the garage door 20, and the controller 15 subsequently receives door operator status information (within a defined window of time) indicating the garage door 20 is closed, then the controller 15 may indicate successful completion of the door close operation to the user (thereby notifying the user that the garage door 20 is closed) by quickly flashing the LED 17 green three times and activating the sound transducer 37 to generate three short tones. However, if the controller 15 fails to receive the proper door operator status information within the defined window of time, then the controller 15 may indicate failure of the door close operation by slowly flashing the LED 17 red five times and activating the sound transducer 37 to generate one long tone. In another embodiment, the status of the garage door 20 may be indicated as one of opening by, for example, slowly flashing the LED 17 orange or yellow and activating the sound transducer 37 to generate slow beeps, and thereafter indicating the status of the garage door 20 as one of opened by quickly flashing the LED 17 green and activating the sound transducer 37 to generate three quick beeps. It should be understood that the foregoing examples for indicating the status of the garage door operator are not intended to limit the scope of the present disclosure or to define operation of the controller in any way. Accordingly, various adaptations and variations may be provided without departing from the scope and spirit of the disclosure as set forth and defined solely by the claims. For example, in some embodiments, the user notification may be provided by way of an LCD screen displaying text indicating the door status rather than (or in addition to) the coded series of lights and sounds.

Wireless communication links between the remote controller 15 and one or more adapters 10 respectively connected with their associated garage door operator microcontrollers 38 may be established and maintained using a suitable protocol. In accordance with the protocol, each device (i.e., adapter 10 and remote controller 15) generally operates in one of two modes: a channel scan mode or a channel lock mode. A device operating in channel scan mode continuously scans multiple frequencies in and around 915 MHz, one channel at a time, for incoming message packets. When a message packet is detected, the device remains on that channel to receive the message packet. If the message packet is valid, an acknowledgement is sent to the device transmitting the message packet, and the device receiving the message packet enters the channel lock mode. A device operating in channel lock mode remains on a particular channel to transmit and receive message packets, as discussed above.

In a preferred embodiment, the controller 15 and each adapter 10 are specifically programmed to carry out a door toggle command transmission (discussed below with reference to FIG. 5), as well as the transmission of door operator status information to remote controllers after the toggle command has been initiated by the remote controller 15 (discussed below with reference to FIG. 6). In the preferred embodiment, the principal purpose of the door operator status transmission is to either give assurance to the driver that the garage door 20 is closing or has closed after the driver has commanded it to close, or to assure the driver that it is opening or open after the driver has commanded it to open, particularly when the driver is not in visible contact with the garage door 20.

In accordance with a preferred embodiment of the present disclosure, when a user actuates a switch 19 of the remote controller 15, a door toggle command is generated, and the door toggle command transmission process is initiated as discussed in greater detail below with respect to the flowchart of FIG. 5. Upon completion of the door toggle command transmission process, the controller 15 receives acknowledgement that the adapter 10 has received the door toggle command, and thereafter automatically initiates the door operator status transmission process, as discussed in greater detail below with respect to the flowchart of FIG. 6.

In an alternate embodiment, the controller 15 and each adapter 10 are specifically programmed to carry out the door operator status transmission process in response to a user input. In the alternate embodiment, the principal purpose of the door operator status transmission is to provide the driver with the status of the garage door 20, particularly when the driver is not in visible contact with the garage door 20. In accordance with the alternate embodiment of the present disclosure, the door operator status transmission process (discussed with respect to FIG. 6) is initiated in response to a user actuating a switch 19 of the remote controller 15.

Figure 4:
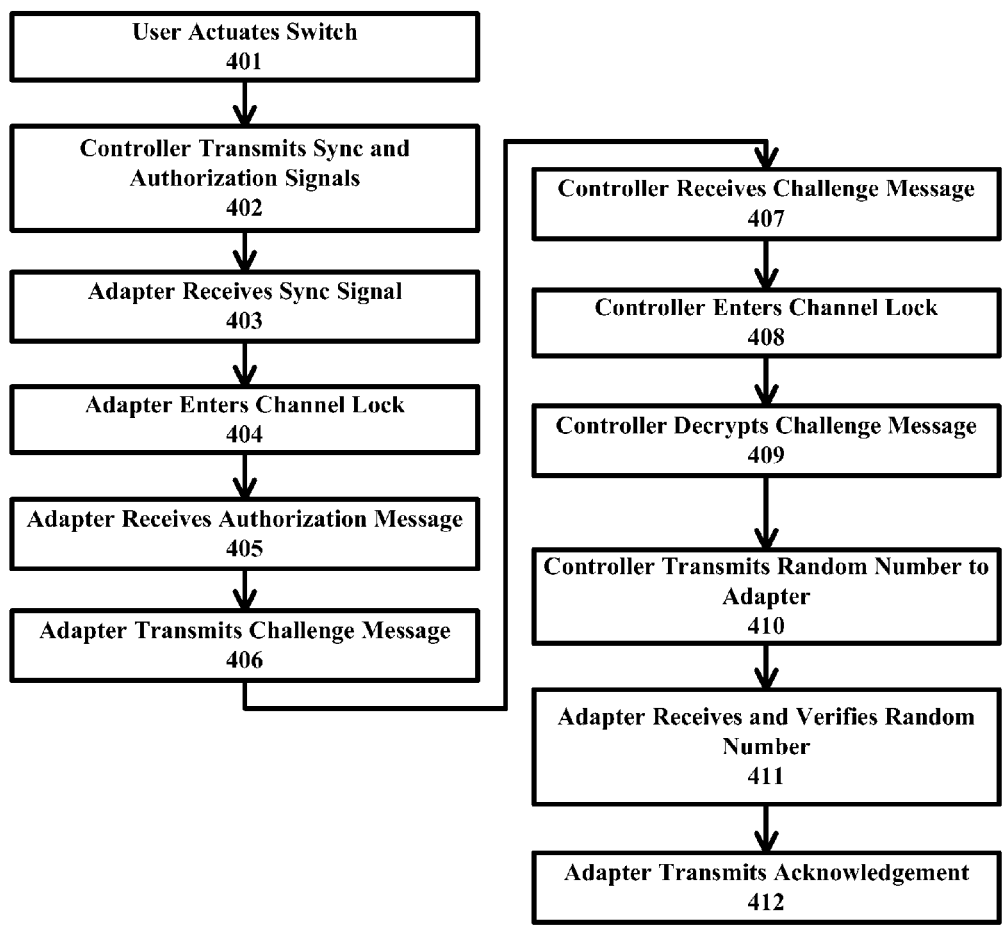
FIG. 4 illustrates a flowchart of one authorization process suitable for use in the present invention.
Figure 5:
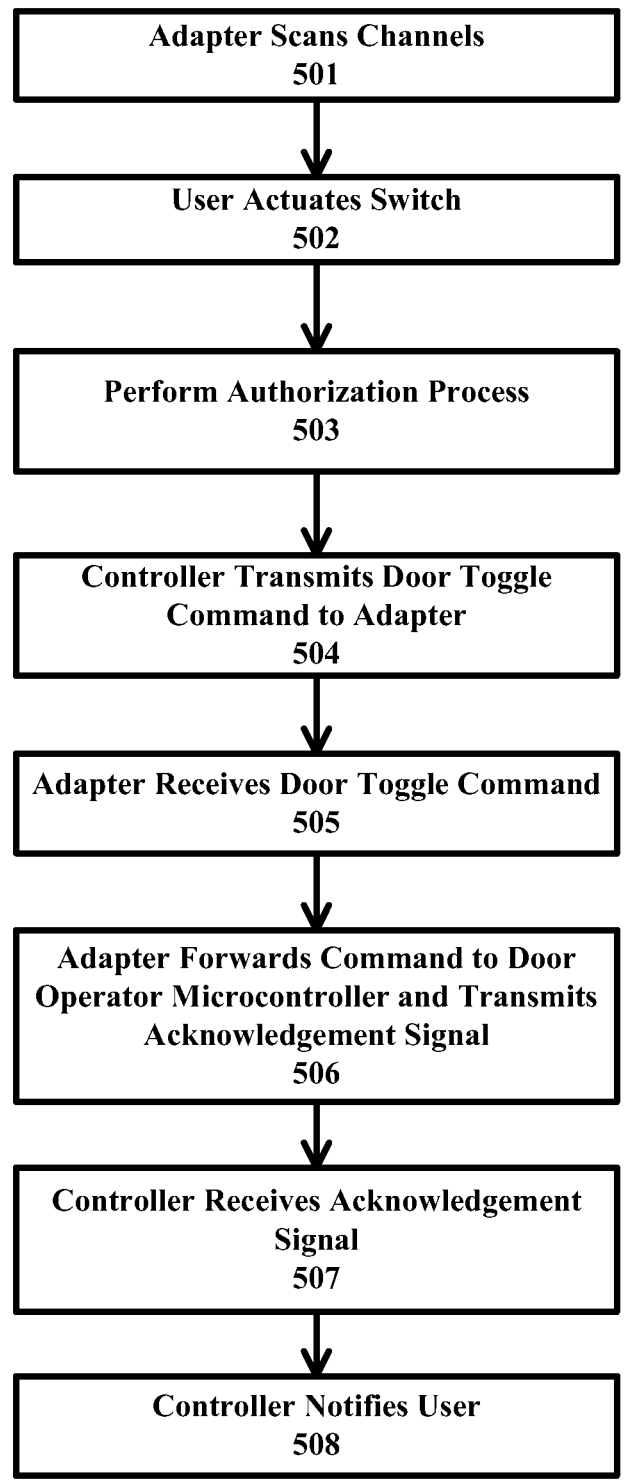
FIG. 5 illustrates a flowchart of one door toggle command transmission process suitable for use in the present invention.

Referring now to the flowchart illustrated in FIG. 5, an example of the door toggle command transmission process is discussed in accordance with the preferred embodiment mentioned above. In this example, the remote controller 15 has already been paired to the adapter 10, and the adapter 10 has established communication with the microcontroller 38 of the garage door operator 21. In step 501, the adapter 10 initially continuously scans multiple frequencies in and around 915 MHz, one channel at a time. In step 502, the user actuates a switch 19 of the remote controller 15. In step 503, the authorization process discussed above with respect to FIG. 4 is performed. Accordingly, the controller 15 receives the acknowledgement signal sent from the adapter 10 in step 412, and is thereby authorized to communicate with the adapter 10. Upon receiving the acknowledgement signal of step 412 in FIG. 4, the controller 15 generates and transmits an encrypted door toggle command message to the adapter 10 in step 504. Upon receipt of the door toggle command in step 505, the adapter 10 forwards the command to the microcontroller 38 of its associated garage door operator 21, and simultaneously transmits, in step 506, a non-encrypted acknowledgement signal confirming that the door toggle command was received by the adapter 10. In step 507, the controller 15 receives the non-encrypted acknowledgement signal and, in step 508, notifies the user that the door toggle command was received by the adapter 10 by, for example, the green illumination of the LED 17 and the generation of an audible tone by the transducer 37, thereby completing the door toggle command operation. In accordance with the preferred embodiment of the present disclosure, the controller 15 automatically initiates the door operator status transmission process discussed below in response to receiving the acknowledgement signal in step 507.

An example of the door operator status transmission process is now discussed with reference to the flowchart illustrated in FIG. 6. As previously mentioned, the door operator status transmission process may be initiated, in a preferred embodiment, in automatic response to receipt of the acknowledgement signal received from the adapter 10 in step 507; or, in an alternate embodiment, the door operator status transmission process may be initiated in response to the user actuating a switch 19 of the remote controller 15. Once the door operator status transmission process is initiated, the remote controller 15 begins a polling process (represented by steps 601-607), in which the controller 15 transmits messages requesting door operator status from the adapter 10 trained to the actuated switch 19. In accordance with the preferred embodiment, this adapter 10 is the same adapter 10 to which the door toggle command was transmitted. In step 601, the controller 15 transmits a door operator status request message to the adapter 10. For each iteration of the polling process, each door operator status request message is transmitted at random time intervals such as, for example, between a minimum time interval of 0.75 seconds and a maximum time interval of 1.75 seconds. Upon transmitting the door operator status request message, the remote controller 15, in step 502, opens a time-limited reception window for receiving a door operator status message. Referring briefly to FIG. 7, an example timing diagram 70 illustrates instances 72 wherein the controller 15 polls the adapter 10 (i.e., transmits a door operator status request message) at 1.0-, 1.25- and 1.5-second intervals. After each instance 72, the controller 15 opens a 0.5-second reception window 74 for receiving a door operator status message.

Referring again to FIG. 6, the targeted adapter 10 responds to each door operator status request that it receives by requesting, in step 603, the status of the garage door operator from the microcontroller 38 of its associated garage door operator 21, receiving the status from the garage door operator microcontroller 38 in step 604, and broadcasting a door operator status message in step 605. It should be understood that the door operator status, as discussed herein, is indirectly indicative of the status of the garage door 20. Each of these door operator status messages is not addressed; they have no source address and no destination address. Neither are any of them encrypted, nor accompanied by any other messages. Moreover, broadcast messages from any adapter are not received by the remote controller that transmitted the door toggle command unless they arrive during the reception window that was created after the initiation of the random time intervals by the remote controller. Thus, rather than the door operator status messages being specifically addressed to any one remote controller from any one adapter, the capture of the appropriate door operator status message by the remote controller 15 depends upon the assumption that the door operator status message received during a reception window is reporting the status of the very door 20 that the controller 15 had just commanded to move via the garage door operator 21. This door operator status message reception operation is generally represented in FIG. 6 by step 606.

In step 607, the controller 15 places the door operator status message received from the adapter 10 in the microprocessor RAM 31. In step 608, the controller 15 then evaluates the received door operator status message. If the door operator status message indicates that door operation is in progress (e.g., door status is "door closing"), the controller 15 continues to poll the adapter 10 at random time intervals. In some embodiments, this evaluation process may include comparing the received door operator status message to the door toggle command. During the polling process, channel lock is reestablished for the controller 15 so that the same adapter 10 continues to respond by transmitting additional door operator status messages, and the controller 15 continues to receive the door operator status messages and places each received door operator status message in the RAM 31.

In accordance with the alternate embodiment of the present disclosure, step 608 may be omitted, and the door status may be indicated to the user is step 610. For example, as mentioned above, the status of the garage door 20 may be indicated by flashing the LED 17 in an appropriate color and activating the sound transducer 37. In other embodiments, the door status may be provided by way of an LCD screen or any other graphical, text-based display capable of displaying text indicating the door status. The controller 15 then clears the RAM 31 and goes to sleep in step 609.

In some embodiments, all of the incoming door operator status messages are stored in RAM 31. If the remote controller 15 does not receive a door operator status message during the time in which the reception window is open, then it continues the polling process. However, in accordance with the preferred embodiment of the present disclosure, if the door operator status message stored in RAM 31 indicates that the operation initiated by the door toggle command is interrupted by a user, then the remote controller 15 clears the RAM 31 and goes to sleep in step 609. For example, if the door toggle command initiates a door close operation, then a received door operator status message indicating the door is opening may indicate that the door operation was interrupted by a user. The user interruption could be caused, for example, by subsequent actuation of the switch actuator 19 or actuation of another controller trained to the adapter or associated with the garage door operator (e.g., second remote controller, wall-mounted controller, etc.).

In accordance with the preferred embodiment, if the remote controller 15 receives no door operator status message in any reception windows for a determined period of time (e.g., fourteen continuous seconds), the controller 15 is unable to determine if the operation initiated by the door toggle command is completed. Thus, in such instances, the operation initiated by the door toggle command (or the door operator status request process) is considered failed. This could occur, for example, if the user drives out of range of the adapter before a door close operation is complete. The operation initiated by the door toggle command may also be considered failed if the door operator status message stored in RAM 31 indicates that the operation initiated by the door toggle command is interrupted by a system fault. For example, a door operator status message indicating that the door reversed direction or stopped moving without user intervention may indicate that the door operation was interrupted by a system fault. This could be caused, for example, by an object detected by sensors when the garage door is in motion, or an item physically obstructing operation of the door. Upon failure of the door operation, the remote controller 15 may notify the user in step 610 to indicate a door operation failure by, for example, illuminating an LED 17 red three times and activating the transducer 37 in a manner that produces one long tone. The remote controller 15 then clears the RAM 31 and goes to sleep in step 609.

In a preferred embodiment, upon the RAM 31 containing a door operator status message indicating that operation initiated by the door toggle command is successful (e.g., the door toggle command is "open door," and the door status is "door open"), the remote controller 15 provides feedback to the user in step 610 by generating a signal that indicates that the door operation was successfully completed, then clears the RAM 31 and goes to sleep in step 609. Thus, the user may interpret the feedback as notification that the status of the garage door 20 is commensurate with the operation intended by the door toggle command. For example, the remote controller 15 may activate the transducer 37 to produce three short beeps, and illuminates a green LED 17 briefly fifteen times, followed by a sixteenth illumination of the LED 17 for a longer duration. If the door toggle command initiates closing of the garage door 20, then the user may interpret this feedback as notification that the status of the garage door 20 is "door closed."

Figure 6:
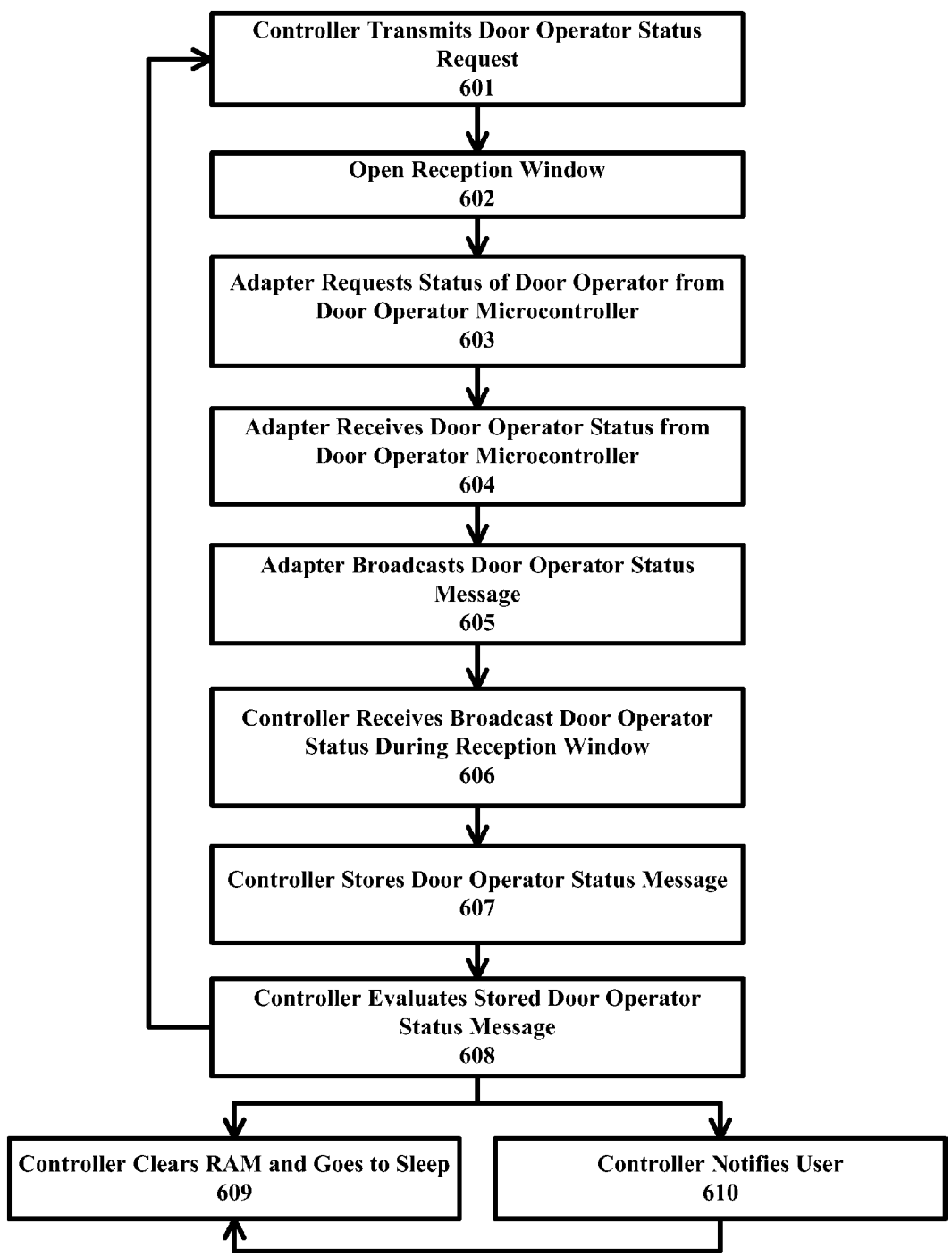
FIG. 6 illustrates a flowchart of one door operator status transmission process suitable for use in the present invention.
Figure 7:
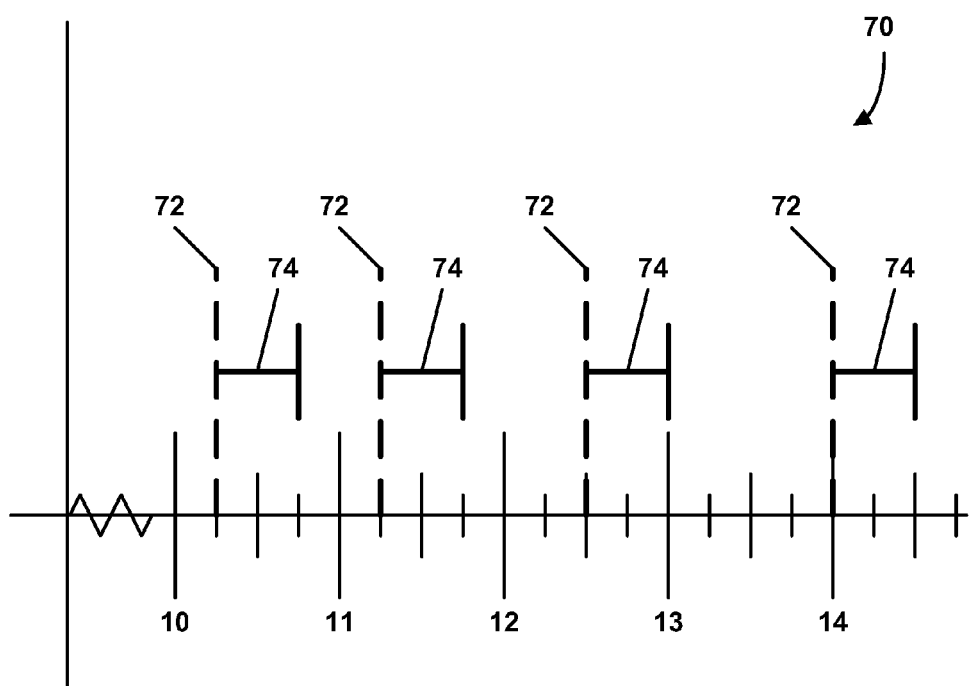
FIG. 7 illustrates an example timing diagram illustrating instances wherein the remote controller of FIG. 1A polls the adapter and generates a reception window of time for receiving a door operator status message.

The flow charts provided in FIGS. 4-6, and the corresponding disclosure, are not intended to represent all operations, calculations, decisions, steps or variations thereof performed by the disclosed system or any of the components comprising the system. Thus, the disclosed system and various components may be capable of performing alternative and/or additional operations other than those illustrated in the figures or discussed herein. For example, although it is not illustrated in FIG. 6, in some embodiments, the door operator status transmission process may also include performing the authorization process discussed above with respect to FIG. 4.

It should be understood that the embodiments discussed herein are intended to provide various examples for implementing one or more components of the disclosed system. Accordingly, various adaptations, variations, and implementations of the disclosed system may be provided without departing from the scope and spirit of the invention as set forth and defined solely by the appended claims. For example, in some embodiments, the user notification may be provided by way of a display screen showing the door status rather than (or in addition to) the coded series of lights and sounds.

What is claimed is:

1. A barrier operator system comprising:
a controller transceiver remotely disposed with respect to a barrier operator, the controller transceiver operable to wirelessly transmit a command signal to an adapter transceiver electrically coupled to the barrier operator, the command signal instructing the barrier operator to effect movement of a barrier between open and closed positions,
wherein the controller transceiver is further operable to automatically transmit, to the adapter transceiver, as a consequence of receiving an acknowledgement signal from the adapter transceiver that acknowledges receipt of the command signal, a request signal requesting a current status of the barrier operator,
wherein the controller transceiver is further operable to generate a first output in response to receipt of a barrier operator status message indicating the current status of the barrier operator, wherein the adapter transceiver is operable to broadcast the barrier operator status message, and the broadcast barrier operator status message contains no address data, and
wherein the controller transceiver is further operable to generate a second output when the controller transceiver fails to receive the barrier operator status message during a limited window of time, content of the second output being based upon the controller transceiver failing to receive the barrier operator status message and indicating that the current status of the barrier operator is unknown.

2. The barrier operator system of claim 1, wherein the adapter transceiver is operable to route the command signal to the barrier operator.

3. The barrier operator system of claim 1, wherein the adapter transceiver is operable to request, from the barrier operator, the current status of the barrier operator in response to receiving the request signal from the controller transceiver.

4. The barrier operator system of claim 1, wherein the controller transceiver is further operable to receive an acknowledgement signal from the adapter transceiver indicating the adapter transceiver's receipt of the command signal.

5. The barrier operator system of claim 4, wherein the request signal is automatically transmitted by the controller transceiver is response to receiving the acknowledgement signal from the adapter transceiver.

6. The barrier operator system of claim 1, wherein the first output indicates the current status of the barrier.

7. A barrier operator system having a barrier operator for effecting movement of a barrier between open and closed positions, the barrier operator system comprising:
a controller transceiver remotely disposed with respect to the barrier operator, the controller transceiver operable to wirelessly transmit a command signal for instructing the barrier operator to effect movement of the barrier between the open and closed positions; and
an adapter transceiver operable to be electrically coupled to the barrier operator, the adapter transceiver operable to receive the command signal, route the command signal to the barrier operator, and to transmit an acknowledgement signal indicating receipt of the command signal,
wherein the controller transceiver is operable, in response to receiving the acknowledgement signal, to automatically transmit, to the adapter transceiver, a request signal requesting a current status of the barrier operator, and to generate a limited window of time for receiving a barrier operator status message indicating the current status of the barrier operator,
wherein the adapter transceiver is further operable, in response to receiving the request signal, to request a current status of the barrier operator from the barrier operator, and to broadcast a barrier operator status message indicating the current status of the barrier operator, wherein the controller transceiver is further operable, in response to receiving a barrier operator status message during the limited window of time, to indicate the current status of the barrier, wherein the adapter transceiver is operable to broadcast the barrier operator status message, and the broadcast barrier operator status message contains no address data, and
wherein the controller transceiver is further operable, in response to not receiving the barrier operator status message during the limited window of time, to indicate that the current status of the barrier is unknown, wherein content of the indication is based upon the controller receiver not receiving the barrier operator status message.

8. A method for indicating a current status of a barrier adapted to be moved between open and closed positions by a barrier operator, the method comprising:
- wirelessly transmitting, from a controller transceiver remotely located with respect to the barrier operator to an adapter transceiver electrically coupled to the barrier operator, a command signal for instructing the barrier operator to effect movement of the barrier between the open and closed positions;
- routing the command signal from the adapter transceiver to the barrier operator;
- transmitting, via the adapter transceiver, an acknowledgement signal indicating receipt of the command signal;
- automatically transmitting, via the controller transceiver in response to receiving the acknowledgement signal, to the adapter transceiver a request signal requesting the current status of the barrier operator, and generating a window of time for receiving a status message indicating the current status of the barrier operator;
- requesting, via the adapter transceiver, the current status of the barrier operator from the barrier operator in response to receiving the request signal;
- broadcasting, via the adapter transceiver, a status message indicating the current status of the barrier operator, wherein the broadcast status message contains no address information;
- generating, via the controller transceiver, a first output if the controller transceiver receives the broadcast status message during the window of time; and
- generating, via the controller transceiver, a second output if the controller transceiver fails to receive the broadcast status message during the window of time, content of the second output being based upon the controller transceiver failing to receive the broadcast status message and indicating that the current status of the barrier operator is unknown, wherein the current status of the barrier operator being unknown indicates that whether the instructed barrier movement was successfully completed is unknown.

9. The method as set forth in claim 8, wherein the first output is indicative of the current status of the barrier.

10. The method as set forth in claim 8, wherein the first output is indicative of successful completion of the instructed barrier movement.

* * * * *